United States Patent [19]

Rankin

[11] 4,330,443

[45] May 18, 1982

[54] DRY CHEMICAL PROCESS FOR GRAFTING ACRYLIC AND METHYL ACRYLIC ESTER AND AMIDE MONOMERS ONTO STARCH-CONTAINING MATERIALS

[75] Inventor: John C. Rankin, Peoria, Ill.

[73] Assignee: The United States of America as represented by the Secretary of Agriculture, Washington, D.C.

[21] Appl. No.: 160,752

[22] Filed: Jun. 18, 1980

[51] Int. Cl.$^3$ ............................................. C08L 3/04
[52] U.S. Cl. .................................... 527/312; 527/314
[58] Field of Search ................. 260/17.4 GC, 17.4 ST

[56] References Cited

U.S. PATENT DOCUMENTS 3,095,391  6/1963  Brockway et al. ......... 260/17.4 GC
3,676,190  7/1972  Landler et al. ............. 260/17.4 GC

*Primary Examiner*—John Kight, III
*Assistant Examiner*—Nathan M. Nutter
*Attorney, Agent, or Firm*—M. Howard Silverstein; David G. McConnell; Curtis P. Ribando

[57] ABSTRACT

Acrylic monomers are grafted onto starch-containing materials by a novel dry state process in which small amounts of peroxides chemically initiate the free radical reaction. Since the process is dry and the resultant products contain no contaminants, it is unnecessary to isolate, wash, and dry them before use. The products are useful in the paper and mineral separation industries.

10 Claims, No Drawings

DRY CHEMICAL PROCESS FOR GRAFTING ACRYLIC AND METHYL ACRYLIC ESTER AND AMIDE MONOMERS ONTO STARCH-CONTAINING MATERIALS

BACKGROUND OF THE INVENTION

1. Field of the Invention

Graft copolymers of starch-containing materials (SCM) with unsaturated organic monomers are well known in the art and can be tailored for use in many diverse applications. For example, starch graft copolymers having the appropriate ionic functionalities have been extensively used in paper and mineral separation industries as pigment retention aids capable of adjunctly serving as internal sizing agents or as flocculants. A discussion of prior art uses of such water-soluble polymers is found in "Recent Advances in Ion-Containing Polymers," M. F. Hoover and G. B. Butler, J. Poly. Sci. Symp. No. 45: 32–34 (1974). However, the future of SCM graft copolymers as an alternative to other functional agents may well hinge upon the introduction of a simple and economical procedure to prepare them. This invention relates to an improved process for the graft polymerization of acrylic monomers onto SCM.

2. Description of the Prior Art

Starch graft polymerizations are conventionally promoted by initiation of free radicals on the starch backbone by (1) chemical treatment, (2) physical treatment, or (3) irradiation. Reviews of these prior art procedures are found in *Block and Graft Copolymerization*, Vol. 1, Chapters 1 and 2, Ed. R. J. Ceresa, John Wiley & Sons, Inc., New York, N.Y. (1973) and "Starch, Graft Copolymers," *Encyclopedia of Polymer Science and Technology*, Supplement No. 2, George F. Fanta and E. B. Bagley, pp. 665–699, John Wiley & Sons, Inc., New York, N.Y. (1977).

Chemical procedures include treatment with (a) inorganic ions, e.g., ceric, chromic, and cobaltic; (b) redox systems incorporating a reducing agent and an oxidizing agent, such as ferrous ion-peroxide; and (c) organic materials, e.g., azo compounds, or solvents such as xylene, etc. All previously known free radical initiations by chemical methods have required a liquid medium which comprises either an aqueous solvent or a combination of aqueous and organic solvents. Consequently, recovery of the polymerization product involves isolation, washing, and drying steps. These steps are often the most difficult and expensive in preparation of SCM graft copolymers because high viscosities develop as the reaction progresses. Also the spent reaction medium has to be recovered and processed in order to avoid contamination of the environment. This has lead to the investigation of several dry methods for preparing SCM graft copolymers.

Physical procedures for initiating free radicals which can be conducted in the dry state include ball milling [J. Poly. Sci. 62(174): S123–S125 (1962), R. L. Whistler and J. L. Goatley], mechanical mastication [Staërke 16(9): 279–285 (1964), B. H. Thewlis], and heat and mastication as by an extruder or similar device ["Water-Soluble Polymers,"*Polymer Science and Technology*, Vol. 2, G. F. Fanta et al., pp. 275–290, Plenum Publishing Corp., New York, N.Y. (1973)]. The resulting products from these procedures are actually block polymers, and they tend to be highly degraded, rubbery to hard, and both chemically and physically brittle.

More useful grafted starch products, although degraded, have been prepared by a dry irradiation technique. Cobalt 60 has been used to initiate the free radicals as described in "Water-Soluble Polymers," supra, and U.S. Pat. No. 3,976,552. Other types of conventional irradiation include electron beam, ultraviolet, and X-rays. However, because of the advance technology required, expense and problems of scaleup, and hazardous nature of the reaction, irradiation techniques for initiation of free radicals in dry grafting of unsaturated organic monomers onto SCM has remained only a laboratory curiosity. These above factors all reduce the commercial desirability and practicability of the prior art methods of producing SCM acrylic graft copolymers.

SUMMARY OF THE INVENTION

I have now unexpectedly discovered that acrylic monomers can be grafted onto SCM in the dry state using a chemical, free radical initiation which does not require a liquid medium. Even more surprising is the discovery that the chemical initiator, consisting essentially of a peroxide, is able to promote free radicals on the starch backbone in a dry state reaction without the need of a reducing agent in a defined redox system. The acrylic monomers and peroxides are added to the SCM as powders or sprays and when the reactants are thoroughly blended, the reaction proceeds without mixing.

In accordance with this discovery, it is an object of the invention to prepare graft copolymers of starch-containing materials by means of a chemically initiated dry state reaction.

It is also an object of the invention to provide a simple and economical procedure for preparing starch-based graft copolymers which are characterized by either cationic, anionic, or nonionic functionalities.

It is a further object of the invention to prepare pigment retention aids and dry strength agents for use in the manufacture of paper which are superior to similar products prepared by dry irradiation techniques.

Other objects and advantages of this invention will become readily apparent from the ensuing description.

DETAILED DESCRIPTION OF THE INVENTION

Starch-Containing Materials (SCM).

The starting substrate useful in these reactions includes starches and flours of cereal grains such as corn, wheat, sorghum, rice, etc. and of root crops such as potato, tapioca, etc. The starches or flours may be unmodified or modified by procedures by which they are dextrinized, hydrolyzed, oxidized, or derivatized as long as they retain sites for subsequent reaction. Starch fractions, namely amylose and amylopectin, may also be employed. These SCM preferably contain their normal moisture content of 10 to 15%, though moisture as high as about 25% can be employed if it is not raised much beyond this level by addition of the reagent.

Reagents

The acrylic monomers which can be grafted onto the above-mentioned SCM in accordance with the invention are characterized by the following structural formulas:

$$CH_2=\overset{R^1}{\underset{|}{C}}-\overset{O}{\underset{\|}{C}}-O-R^2-A, \quad (1)$$

$$CH_2=\overset{R^1}{\underset{|}{C}}-\overset{O}{\underset{\|}{C}}-NH-R^2-A, \text{ and} \quad (2)$$

$$CH_2=\overset{R^1}{\underset{|}{C}}-\overset{O}{\underset{\|}{C}}-B \quad (3)$$

wherein
$R^1=$ —H, or is from the group of $C_1$–$C_6$ straight, branched, or cyclic alkyl radicals;

$$R^2 = =H, -CH_2-\underset{H}{\overset{OH}{\underset{|}{C}}}-(CH_2)_n-, \text{ or } \left(\underset{R^3}{\overset{R^3}{\underset{|}{C}}}\right)_m-(CH_2)_n-,$$

with the proviso that if $R^2$ is —H, then the functional group A is eliminated;
wherein each $R^3$ is independently selected from the group of —H, and $C_1$–$C_6$ straight or branched alkyl radicals, and wherein two $R^3$ substituents may be joined together to form a cyclic structure; and wherein
m=0, 1 and
n=1–6;

Of particular interest, without limitation thereto, are monomers in which A and B are as follows:

A = a cationic group selected from:

$$-N\overset{R^3}{\underset{R^3}{\diagup}}, \quad -N\overset{R^3}{\underset{R^3}{\diagup}} HX, \text{ and } -N^\oplus\overset{R^3}{\underset{R^3}{\diagdown}}-R^3X'^\ominus$$

wherein
$R^3$ is as defined above, and may be the same as or different from the $R^3$ on the $R^2$ group; and wherein
$X = Cl^-$, $Br^-$, or $I^-$; and
$X' = X$, $R^3X$, or $R^3SO_4^-$;
or an anionic group selected from:

$$-\overset{O}{\underset{\|}{\underset{O}{S}}}-O^\ominus R^{4\oplus}, \quad -\overset{O^\ominus}{\underset{\|}{C}}-OR^{4\oplus}, \text{ and } -\overset{O}{\underset{\|}{\underset{O}{P}}}-O^\ominus R^{4\oplus},$$

wherein
$R^4$ is —H, alkali or alkali earth metal, or is from the group of $C_1$–$C_6$ straight, branched, or cyclic alkyl radicals;
or a nonionic group selected from:

$$-\overset{O}{\underset{\|}{C}}-CH_3, \quad -CH_2-\overset{O}{\underset{\|}{C}}-(CH_2)_n-R^1, \quad -CH_2-O-(CH_2)_n-R^1$$

$$-CH_2-\overset{OH}{\underset{|}{CH}}-(CH_2)_n-R^1, \text{ and } \left(\underset{R^3}{\overset{R^3}{\underset{|}{C}}}\right)_m-(CH_2)_n-R^1$$

wherein $R^1$, $R^3$, m, and n are as defined above and may be the same as or different from similar designations in the structure; and $$B = -N^\ominus-N^\oplus\overset{R^3}{\underset{R^3}{\diagup}}-R^5 \text{ or } -\overset{\oplus}{N}H-N\overset{R^3}{\underset{R^3}{\diagup}}-R^5X^\ominus$$

wherein $R^3$ and X are as defined above; and wherein $R^5 = $ —$CH_3$, $$-CH_2\overset{OH}{\underset{|}{CH}}-(CH_2)_r-CH_3, \text{ or } -CH_2\overset{OH}{\underset{|}{CH}}CH_2OH,$$

wherein r=0–7.

Of course, it is understood that mixtures of the monomers could also be employed.

Expressed in terms of weight percent, the amount of reagent for use in the reaction should be in the range of about 1–150% based on the dry weight of the SCM starting material. However, 3 to 18 weight percent is preferred.

Catalysts

Peroxide catalysts which can be incorporated in the reaction mixture to initiate free radicals include hydrogen peroxide; organic peroxides such as benzoyl, and acetyl; and inorganic peroxides of alkali and alkali earth metals such as sodium and calcium. In accordance with the invention, these peroxides constitute non-redox catalysis systems. Such a system is defined herein as one which excludes a discrete reducing agent; that is, an oxidizable agent present in the reaction mixture having the primary function of reducing the peroxide. For the non-flour SCM, the amount of peroxide needed to effect catalysis expressed as weight percent of $O_2$ based upon the dry weight of the SCM will be in the range of about 0.01 to about 0.5%, with the preferred range being 0.02–0.2%. It should be noted that the peroxides also serve as bleaching agents for the flours in the reaction. For example, a white corn flour product may be produced from a yellow corn flour starting material. Therefore, because of the color pigment (xanthophyll) and protein content of the flours about twice the amount of peroxide is needed as compared with a similar starch grafting reaction. Also, because the content of protein and pigment in agricultural vary from growing season to growing season, this amount of peroxide might require some adjustment to achieve the desired results for flours.

Reaction Conditions

When admixed with the SCM, the reagent and peroxide additives may be in either a dry powdery state or else dissolved or dispersed in a liquid vehicle such as water. The order of addition is not critical. If a vehicle is employed, its level should be limited to the extent that the reaction mixture as a whole remains in the form of a powder and its total moisture content is not raised beyond about 25% whereby the SCM would become sticky. A reaction mixture so characterized is defined herein as being in the dry state. Suitable reaction vessels include mixers of the conventional types used in industry, such as sigma blades, ribbon blades, pin blades, etc. I have found that continued mixing is optional once the additives have been thoroughly impregnated into the SCM. This may vary from a few minutes to several hours depending on the efficiency of equipment and the scale of run. The point of thorough impregnation would be readily determinable by a person or ordinary skill in the art. The reaction is carried out on the acid side at about pH 2 to 6.5. Since most SCM are inherently characterized by a pH in the range of 5–7, adjustment is usually unnecessary. The reaction temperatures are normally held within the range of about 25°–100° C. for inversely related periods of time ranging from 3 weeks to 1–2 hours, in which time the reaction is completed. The reaction is finished in 4 hours at 70° C. and 8 hours at 60° C.

Properties of Products

SCM graft copolymers of ionic monomers produced by this method are generally characterized by their change. Quality products are determined by the positive (cationic) or negative (anionic) charge possessed by samples that maintain them over a pH range of 3 to 10, whereas starting materials or samples that have not completely reacted with the reagent do not maintain the same ionic charge over the pH range. For those SCM products possessing a positive charge, cationic efficiencies are also helpful in determining their quality and effectiveness in end-use applications such as pigment retention aids in paper pulp. If reacted to completion within the limits of the time and temperature parameters set forth above, cationic efficiencies on the order of 99–100% are normally obtained. The SCM acrylic acids and esters (Formula 1), amides (Formula 2), and aminimides (Formula 3) produced by this process can be used in whatever application that similar products are conventionally employed as known in the art, and over a broad range of acid and alkaline pH's from about 3–10. For example, in the manufacture of paper, the cationic derivatives are useful pigment retention aids and strengthening agents when added to the wet pulp in concentration on the order of about 0.1 to 2% based on the dry weight of the pulp. These products may also be used in conjunction with other additives which are compatible with their ionic functionality as easily determined by a person in the art.

Test Methods

For purposes of evaluating the SCM products prepared in the examples below, the following tests procedures were employed.

1. pH was measured with a Beckman meter on a 1–2% aqueous pasted sample. The pasting procedures were water bath or steam jet cooking as described in Die Stärke 28(5): 174 (1976).

2. Streaming current values were measured with a streaming current detector manufactured by Water Associates, Inc., Framingham, Mass. The instrument determines the magnitude of the cationic (positive) or anionic (negative) charge possessed by a sample. A 0.5% pasted sample (water bath cooked) was tested for these values (SCV) at various pH levels. The pH value was obtained by adjusting the paste solution with either 1 N HCl or NaOH solutions.

3. Cationic efficiency was determined by a modified procedure of Mehltretter et al., Tappi 46(8): 506 (1963) as reported in Tappi 52(1): 82 (1969). Briefly, percent efficiency was obtained photometrically when a 0.5% paste (cooked by water bath) sample is tested for the retention on dilute cellulosic pulp fibers of "Halopont Blue" (an intensely blue organic pigment).

4. Handsheets were made and tested by procedures cited in Tappi 52(1): 82 (1969). Controls containing no product additive as well as those containing 2% of product additive based on oven-dried unbleached pulp were prepared. The percent increase in sheet properties due to the additive were reported. Products tested were 1% pasted samples prepared by steam jet cooking.

5. Nitrogen determinations (dry basis) on samples were obtained by Kjeldahl analyses and moisture content on samples by drying them to constant weight at 100° C. in vacuo over phosphorous pentoxide.

6. To determine the amount of monomer grafted to polymer (SCM+monomer) and homopolymer (monomer+monomer) in the products, samples were washed by the following method: (1) distilled water; (2) 60:40 mixture by volume of ethanol:distilled water; (3) 100% ethanol. Ten grams of sample were stirred in a centrifugal bottle for ½ hour with 100 ml. of (1) at 25° C. The slurry was then centrifuged for 15 minutes and the supernatant poured off. This was repeated once. The residue was stirred with 100 ml. of (2), stirred with 100 ml. of (3), centrifuged, filtered, and washed with (3). The washed sample was oven dried overnight at 50° C., ground up, and analyzed.

The following examples are intended only to further illustrate the invention and are not intended to limit the scope of the invention which is defined by the claims.

EXAMPLE 1

One hundred and twenty-five grams (dry basis) of commercially obtained wheat starch having a 10% moisture content and 0.08% Kjeldahl nitrogen were placed in a laboratory model sigma blade kneading machine equipped with a removable transparent plastic cover, reagent admitting means, and a valved jacket for confining steam or coolant. The reagent was "Sipomer Q-6" (solution, Table I) of which 20 g. (75%, 12 weight percent monomer based on dry weight of starch) was sprayed onto the starch in 10 minutes while mixing. Mixing was continued ¼ hour before flaking in powdered "Novadelox" 0.74 g. (32% benzoyl peroxide, 0.024% O$_2$ based on dry weight of starch). Mixing was continued another ¼ hour, stopped, and samples were removed, bottled, and stored at 60° C. for 6 hours (A), 8 hours (B), and 10 hours (C). Table II gives results of analyses at various reaction time periods.

A superior operative final cationic product is indicated by the presence of significantly increased retention efficiency of "Halopont" pigment dye (cationic efficiency) by the pulp and in the magnitude and positive (cationic) charge (SCV) over pH range of 3 to 10 as compared to those found for wheat starch (starting material) and sample 1A.

EXAMPLE 2

Example 1 was repeated except a temperature of 70° C. was used for sample (A) 2 hours, (B) 4 hours, (C) 6 hours. Results are given in Table III.

EXAMPLE 3

Example 1 was repeated except for the following: The reagent was "Sipomer Q-1" (solid, Table I) of which 16.7 g. (90%, 12 weight percent monomer based on dry weight of starch) was flaked into the starch. "Novadelox" was increased to 5.9 g. (32% benzoyl peroxide, 0.2% O$_2$ based on dry weight of starch). Sample (A) was reacted at 25° C., (B) at 70° C., and (C) at 100° C. Samples were analyzed at various time periods to monitor the reaction and final results are present in Table IV. Further evaluation of products A and C is given in Example 14.

TABLE I

| Acrylic monomer | Structure | Mole wt. | % Monomer in reagent | Physical state | Charge | Company | Reagent Trade name |
|---|---|---|---|---|---|---|---|
| 2-hydroxy-3-methacryloyl-oxypropyltrimethylammonium chloride | $CH_2=C(CH_3)-C(O)-OCH_2-C(OH)(H)-CH_2\overset{+}{N}(CH_3)_3Cl^-$ | 237.6 | 90 | solid | cationic | Alcolac Chemical Corp. | Sipomer Q-1 |
| 2-methacryloyloxyethyl-trimethylammonium methyl sulfate | $CH_2=C(CH_3)-C(O)OCH_2CH_2\overset{+}{N}(CH_3)_3CH_3OSO_3^-$ | 283.4 | 40 | liquid | cationic | Alcolac Chemical Corp. | Sipomer Q-5 |
| 2-methacryloyloxyethyl-trimethylammonium chloride | $CH_2=C(CH_3)-C(O)OCH_2CH_2\overset{+}{N}(CH_3)_3Cl^-$ | 207.6 | 75 | liquid | cationic | Alcolac Chemical Corp. | Sipomer Q-6 |
| methacrylamidopropyl-trimethylammonium chloride | $CH_2=C(CH_3)-C(O)NH(CH_2)_3\overset{+}{N}(CH_3)_3Cl^-$ | 220.8 | 50 | liquid | cationic | Jefferson Chemical Co. | MAPTAC |
| 2-acrylamido-2-methyl-propanesulfonic acid | $CH_2=C(H)-C(O)NHC(CH_3)_2-CH_2SO_3^-H$ | 207.0 | 100 | solid | anionic | Lubrizol Corp. | AMPS |
| 3-acrylamido-3-methyl butyltrimethylammonium chloride | $CH_2=C(H)-C(O)NHC(CH_3)_2-CH_2CH_2\overset{+}{N}(CH_3)_3Cl^-$ | 234.8 | 100 | solid | cationic | Lubrizol Corp. | AMBTAC |

TABLE II

| | Reaction conditions | | Results | | | |
|---|---|---|---|---|---|---|
| | | | SCV | | | % |
| Example | Time, hours | Temp., °C. | pH 3 | pH 6 | pH 10 | Cationic efficiency |
| 1A | 6 | 60 | +2.8 | +2.8 | −0.1 | 47 |
| 1B | 8 | 60 | +11.5 | +5.6 | +4.9 | 100 |
| 1C | 10 | 60 | +6.3 | +8.9 | +3.3 | 100 |
| wheat starch | — | — | +2.0 | −16.0 | −18.0 | 37 |

Products A, B, and C have 13% moisture and 0.77% nitrogen; pH of pastes was 4.3.

TABLE III

| | Reaction conditions | | Results | | | |
|---|---|---|---|---|---|---|
| | | | SCV | | | % |
| Example | Time, hours | Temp., °C. | pH 3 | pH 6 | pH 10 | Cationic efficiency |
| 2A | 2 | 70 | +3.1 | +2.9 | −0.7 | 47 |
| 2B | 4 | 70 | +9.2 | +7.4 | +4.3 | 99 |
| 2C | 6 | 70 | +11.0 | +12.3 | +5.9 | 99 |

Products A, B, and C have 14% moisture, and 0.78% nitrogen; pH of pastes was 4.3.

TABLE IV

| | Reaction conditions | | Results | | | |
|---|---|---|---|---|---|---|
| | | | SCV | | | % |
| Example | Time | Temp., °C. | pH 3 | pH 6 | pH 10 | Cationic efficiency |
| 3A | 21 days | 25 | +8.0 | +12.7 | +5.0 | 100 |
| 3B | 4 hours | 70 | +14.5 | +18.0 | +5.6 | 100 |
| 3C | 2 hours | 100 | +16.3 | +12.1 | +4.0 | 100 |

Products A, B, and C have 14% moisture, and 0.70% nitrogen; pH of pastes was 4.7.

EXAMPLE 4

Example 1 was repeated except for the following: The reagent was "Sipomer Q-5" (solution, Table I) of which 47 g. (40%, 15 weight percent monomer based on dry weight of starch was sprayed onto the starch. "Novadelox" was increased to 5.9 g. (32% benzoyl peroxide, 0.2% O₂ based on dry weight of starch). The sample was reacted for 2 hours at 100° C. The final product had 23% moisture, 0.70% nitrogen, pH 4, SCV at pH 3+10.8, pH 6+6.9, pH 10+4.8, and cationic efficiency 100%. Further evaluation of this product is given in Example 14.

EXAMPLE 5

Example 1 was repeated except for the following: The reagent was "MAPTAC" (solution, Table I) of which 30 g. (50%, 12 weight percent monomer based on dry weight of starch) was sprayed onto the starch. Hydrogen peroxide was used instead of benzoyl peroxide and 0.88 g. (30% peroxide, 0.19% O₂ based on dry weight of starch) was sprayed onto the starch. The sample was reacted for 2 hours at 100° C. The final product had 19% moisture, 1.42% nitrogen, pH 4.5, SCV at pH 3+9.4, pH 6+5.1, pH 10+4.6, and cationic efficiency 99%. Further evaluation of this product is given in Example 14.

EXAMPLE 6

Example 1 was repeated except for the following: The reagent was "AMBTAC" (solid, Table I) of which 15 g. (100%, 12 weight percent monomer based on dry weight of starch) was flaked into the starch. "Novadelox" was increased to 5.9 g. (32% benzoyl peroxide, 0.2% O₂ based on dry weight of starch). The sample was reacted 2 hours at 100° C. The final product had 12% moisture, 1.27% nitrogen, pH 4.2, SCV at pH 3+8.4, pH 6+10, pH 10+3.4, and cationic efficiency 99%.

EXAMPLE 7

Example 1 was repeated except for the following: The reagent was "AMPS" (solid, Table I) of which 15 g. (100%, 12 weight percent monomer based on dry weight of starch) was flaked into the starch. "Novadelox" was increased to 5.9 g. (32% benzoyl peroxide, 0.2% O₂ based on dry weight of starch). The sample was reacted 2 hours at 100° C. The final product had 14% moisture, 0.88% nitrogen, pH 3.4, and SCV at pH 3 −14, pH 6 −19, pH 10 −21. The excellency of this anionic product is shown by the magnitude and negativity of its charge over a pH range of 3 to 10.

EXAMPLE 8

Example 1 was repeated except for the following: The reagent was "Sipomer Q-1" (solid, Table I). "Novadelox" was increased to 5.9 g. (32% benzoyl peroxide, 0.2% $O_2$ based on dry weight of starch). In sample (A) 18.9 g. (90%, 13.6 weight percent monomer based on dry weight of starch) of reagent was used, (B) 14.4 g. (10.4 weight percent), (C) 8.9 g. (6.4 weight percent), and (D) 4.4 g. (3.2 weight percent). The samples were reacted 2 hours at 100° C. To determine the amount of monomer grafted to the SCM, the homopolymer was washed out of the products by test procedure 6, analyzing both product and washed product. As noted by the results given in Table V, a relatively large proportion of the monomer is grafted onto the SCM. Further evaluation of these products is given in Example 14.

EXAMPLE 9

For purposes of comparing the process of the invention to that of the prior art, Example 1 was repeated except for the following: The starch was 100 g. (dry basis) and the reagent was "Sipomer Q-5" (solution, Table I) of which 15.2 g. (40%, 6 weight percent monomer based on dry weight of starch) was sprayed onto the starch. Portions of the sample were bottled and irradiated with a Cobalt 60 source at three levels. Sample (A) 0.1 Mrad, (B) 1.0 Mrad, (C) 3.0 Mrad. The results are presented in Table VI.

EXAMPLE 10

Comparative Example 9 was repeated except for the following: The starch was 125 g. (dry basis) and the reagent was "Sipomer Q-1" (solid, Table I) of which 12.6 g. (90%, 9 weight percent monomer based on dry weight of starch) was flaked into the starch. The results are presented in Table VI.

TABLE V

| Example | Product, % Moisture | Product, % Nitrogen | Washed product, % Moisture | Washed product, % Nitrogen | % Monomer grafted to SCM* |
| --- | --- | --- | --- | --- | --- |
| 8A | 13 | 0.69 | 7 | 0.49 | 71 |
| 8B | 12 | 0.54 | 8 | 0.36 | 67 |
| 8C | 12 | 0.40 | 7 | 0.29 | 73 |
| 8D | 13 | 0.23 | 7 | 0.15 | 65 |

*% Monomer grafted to SCM = $\frac{\text{\% nitrogen washed product}}{\text{\% nitrogen product}} \times 100$.

EXAMPLE 11

Comparative Example 9 was repeated except for the following: The starch was 125 g. (dry basis) and the reagent was "MAPTAC" (solution, Table I) of which 7.6 g. (50%, 3 weight percent monomer based on dry weight of starch) was sprayed onto the starch. The results are presented in Table VI.

The cationic products prepared by the irradiation techniques of Examples 9–11 were inferior to the cationic products in the preceding examples of this invention as shown by their SCV and cationic efficiency values.

EXAMPLE 12

For comparative purposes, Example 5 was substantially repeated without the peroxide catalyst. The reagent was "MAPTAC" (solution, Table I) of which 30 g. (50%, 12 weight percent based on dry weight of starch) was sprayed onto the starch. The mixture was held for 4 hours at 100° C. The moisture content, nitrogen content, paste pH, SCV, and cationic efficiency of the product were determined. The product was then washed by test procedure 6, and the moisture and nitrogen contents were again determined. The nitrogen content was less than in the wheat starch starting material. The results are shown in Table VII.

EXAMPLE 13

For comparative purposes, Example 6 was substantially repeated without the peroxide catalyst. The reagent was "AMBTAC" (solid, Table I) of which 15 g. (100%, 12 weight percent monomer based on dry weight of starch) was flaked into the starch. The mixture was held for 4 hours at 100° C. The moisture content, nitrogen content, paste pH, SCV, and cationic efficiency of the product were determined. The product was then washed by test procedure 6, and the moisture and nitrogen contents were again determined. The nitrogen content was less than in the wheat starch starting material. The results are shown in Table VII.

TABLE VI

| | | Analysis | | | Results | | | |
| --- | --- | --- | --- | --- | --- | --- | --- | --- |
| Example | $Co^{60}$ Mrad | % Moisture | % N | pH of paste | SCV pH 3 | SCV pH 6 | SCV pH 10 | % Cationic efficiency |
| 9A | 0.1 | 17 | 0.30 | 4.8 | +2.4 | +2.4 | −9.3 | 42 |
| 9B | 1.0 | 17 | 0.30 | 4.8 | +16.0 | +9.8 | +2.1 | 60 |
| 9C | 3.0 | 17 | 0.30 | 4.8 | +6.9 | +11.0 | +1.1 | 64 |
| 10 | 3.0 | 14 | 0.69 | 5.6 | +10.8 | +15.9 | +1.1 | 58 |
| 11 | 3.0 | 16 | 0.38 | 5.0 | +6.1 | +8.8 | +0.8 | 55 |

TABLE VII

| Example | Product, % Moisture | Product, % Nitrogen | Washed product, % Moisture | Washed product, % Nitrogen | % Monomer grafted to SCM* | pH of paste | SCV pH 3 | SCV pH 6 | SCV pH 10 | % Cationic efficiency |
| --- | --- | --- | --- | --- | --- | --- | --- | --- | --- | --- |
| 12 | 18 | 1.38 | 8 | 0.04 | <3 | 6.0 | +4.3 | −0.7 | −2.4 | 34 |
| 13 | 13 | 1.41 | 7 | 0.02 | <2 | 6.0 | +4.9 | +0.5 | −0.7 | 34 |

*% Monomer grafted to SCM = $\frac{\text{\% nitrogen washed product}}{\text{\% nitrogen product}} \times 100$.

The SCV and cationic efficiency values and the nitrogen result on the washed product of Examples 12 and 13 indicated that the reaction did not take place in the absence of peroxide.

EXAMPLE 14

Unbleached handsheets were prepared and tested as described above in test 4. Results are given in Table VIII. Products of this invention were far superior in increasing burst (three times) and tensile (six times) strengths in unbleached handsheets above that of the starting material. Also they were considerably better than that of the $Co^{60}$ irradiated sample of Example 9C. The jet-cooked pastes of Examples 8A, B, C, and D after standing 24 hours at room temperature showed a definite pattern of improvement in preventing paste retrogradation (settling out of solids) due to the modification. The improvement was 14>10>6>3 weight percent of the reagent, whereas the wheat starch starting material and Example 9C settled out in 1 hour.

It is to be understood that the foregoing detailed description is given by way of illustration and that modification and variations may be made therein without departing from the spirit and scope of the invention.

TABLE VIII

| Example | 2% Addition of sample to unbleached handsheets | |
|---|---|---|
| | % Burst* | % Tensile* |
| 3A | 47 | 34 |
| 3C | 55 | 32 |
| 4 | 49 | 28 |
| 5 | 50 | 31 |
| 8A | 55 | 33 |
| 8A (washed) | 55 | 32 |
| 8B | 51 | 29 |
| 8C | 47 | 31 |
| 8D | 42 | 31 |
| 9C | 32 | 21 |
| starting material (wheat starch) | 17 | 5 |

*% Increase over control paper containing no sample.

I claim:

1. In a method for preparing a graft copolymer of a starch-containing material and an acrylic monomer selected from the group consisting of compounds having the following structural formulas:

$$CH_2=\overset{R^1}{\underset{|}{C}}-\overset{O}{\underset{\|}{C}}-O-R^2-A, \quad (1)$$

$$CH_2=\overset{R^1}{\underset{|}{C}}-\overset{O}{\underset{\|}{C}}-NH-R^2-A, \text{ and} \quad (2)$$

$$CH_2=\overset{R^1}{\underset{|}{C}}-\overset{O}{\underset{\|}{C}}-B \quad (3)$$

wherein
$R^1$=—H, or is from the group of $C_1$–$C_6$ straight, branched, or cyclic alkyl radicals;

$$R^2 = -H, \ -CH_2-\underset{\underset{H}{|}}{\overset{OH}{\underset{|}{C}}}-(CH_2)_n-, \text{ or } -\left(\underset{\underset{R^3}{|}}{\overset{R^3}{\underset{|}{C}}}-(CH_2)_n-\right)_m$$

with the proviso that if $R^2$ is —H, then the functional group A is eliminated;
wherein each $R^3$ is independently selected from the group of —H, and $C_1$–$C_6$ straight or branched alkyl radicals, and wherein two $R^3$ substituents may be joined together to form a cyclic structure; and wherein
m=0, 1 and
n=1–6;

A=a cationic, anionic, or nonionic functional group; and
B=—N⊖-amine⊕ or —⊕NH-amine-halogen⊖;
the improvement comprising reacting said starch-containing material with said monomer in a dry state and in the presence of a peroxide in a non-redox catalysis system.

2. The method as described in claim 1 wherein said starch-containing material is selected from the group consisting of cereal grain starches, cereal grain flours, root crop starches, and root crop flours.

3. The method as described in claim 1 wherein the acrylic monomer is characterized by either Formula 1 or Formula 2, and A is cationic and is selected from the group consisting of:

$$-N\overset{R^3}{\underset{R^3}{<}}, \ -N\overset{R^3}{\underset{R^3}{<}}HX, \text{ and } -N^{\oplus}\overset{R^3}{\underset{R^3}{<}}R^3X'^{\ominus}$$

wherein
$R^3$ is as defined previously and may be the same as or different from the $R^3$ on the $R^2$ group; and wherein
X=$Cl^-$, $Br^-$, or $I^-$; and
X′=X, $R^3X$, or $R^3SO_4^-$.

4. The method as described in claim 1 wherein the acrylic monomer is characterized by either Formula 1 or Formula 2, and A is anionic and is selected from the group consisting of:

$$-\underset{\underset{O}{\|}}{\overset{\overset{O}{\|}}{S}}-O^{\ominus}R^{4\oplus}, \ -\overset{O^{\ominus}}{\underset{\|}{C}}-OR^{4\oplus}, \text{ and } -\underset{\underset{O}{\|}}{\overset{\overset{O}{\|}}{P}}-O^{\ominus}R^{4\oplus},$$

wherein $R^4$ is —H, alkali or alkali earth metal, or is from the group of $C_1$–$C_6$ straight, branched, or cyclic alkyl radicals.

5. The method as described in claim 1 wherein the acrylic monomer is characterized by either Formula 1 or Formula 2, and A is nonionic and is selected from the group consisting of:

$$-\overset{O}{\underset{\|}{C}}-CH_3, \ -CH_2-\overset{O}{\underset{\|}{C}}-(CH_2)_n-R^1, \ -CH_2-O-(CH_2)_n-R^1$$

$$-CH_2-\overset{OH}{\underset{|}{C}}H-(CH_2)_n-R^1, \text{ and } \left(\overset{R^3}{\underset{\underset{R^3}{|}}{\overset{|}{C}}}-(CH_2)_n-R^1\right)_m$$

wherein $R^1$, $R^3$, m, and n are as defined previously and may be the same as or different from similar designations in the structure.

6. The method as described in claim 1 wherein the acrylic monomer is characterized by Formula 3 and B is selected from the group consisting of:

$$-N^{\ominus}-N^{\oplus}\overset{R^3}{\underset{R^3}{<}}R^5 \text{ and } -\overset{\oplus}{N}H-N\overset{R^3}{\underset{R^3}{<}}R^5X^{\ominus}$$

wherein
$R^3$ is as defined previously, wherein $R^5 = -CH_3,$

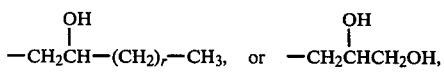

wherein r=0–7; and wherein
$X = Cl^-, Br^-, or\ I^-.$

7. The method as described in claim 1 wherein said peroxide catalyst is an organic peroxide.

8. The method as described in claim 7 wherein said organic peroxide is benzoyl peroxide.

9. The method as described in claim 1 wherein said peroxide catalyst is an inorganic peroxide.

10. The method as described in claim 1 wherein said peroxide catalyst is hydrogen peroxide.

* * * * *